3,391,425
CONTROL FOR PLUNGER IN TRANSFER
MOULDING PRESSES
Herbert Maurice Gardner, King's Stanley, Gloucestershire, England, assignor of one-half to T. H. & J. Daniels Limited, Stroud, Gloucestershire, England, a British company
Filed June 13, 1966, Ser. No. 557,279
Claims priority, application Great Britain, June 15, 1965, 25,336/65
5 Claims. (Cl. 18—30)

This invention relates to transfer moulding presses for rubber and thermosetting plastics materials.

It is the chief object of the invention to provide means which will be effective to control the amount of material transferred into a particular mould irrespective of variations in the volume of the material with which the machine is initially charged.

Broadly, in accordance with the invention in a transfer moulding press including a transfer pot into which material to be injected into a mould is loaded and an hydraulically operated transfer plunger adapted on operation to force material from said pot into the mould, means are provided which are adapted to be actuated automatically, subsequently to an initial movement of the plunger to consolidate material present in the pot, to control the length of the actual transfer stroke of said plunger. Preferably the means will include a cam element adapted to be preset to provide for a predetermined length of stroke, means adapted to be actuated, as a result of an increase in hydraulic pressure in the transfer circuit due to consolidation of the material in the transfer pot, to cause said cam element to be effectively coupled to the transfer plunger to move therewith and a control switch or the like adapted to be actuated by said cam element to stop the transfer plunger on completion of the pre-set stroke.

Figure 1:
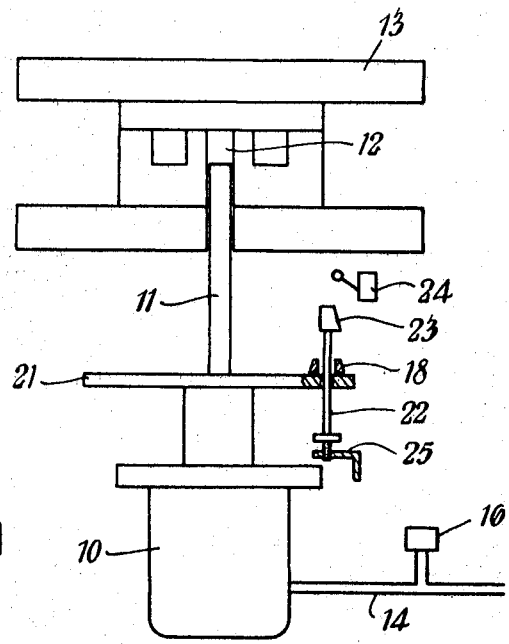
Figure 2:
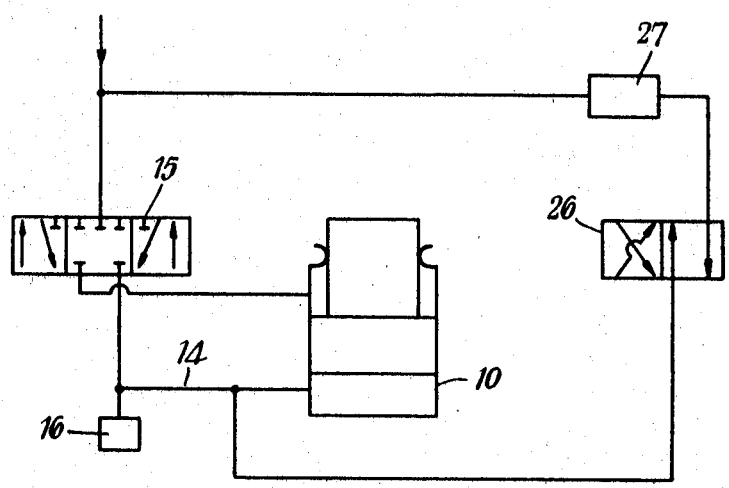
Figure 3:
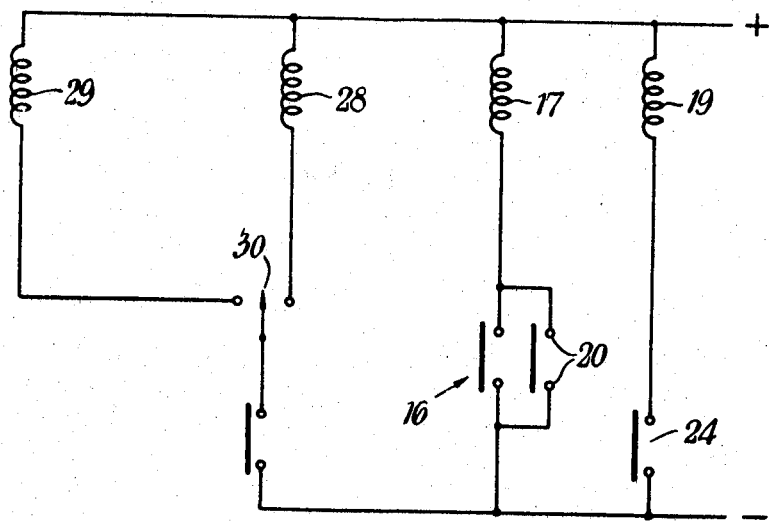
Figure 4:
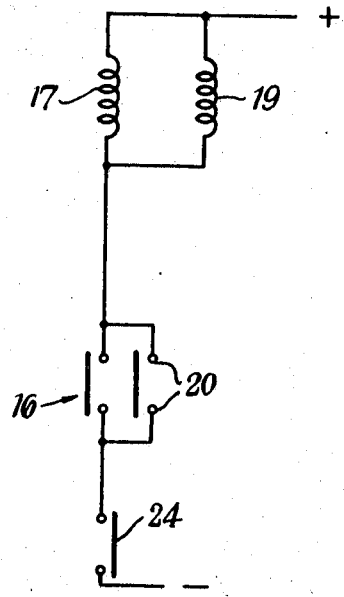

In order that the invention may be clearly understood and readily carried into effect reference will now be made to the accompanying diagrammatic drawings in which:

FIGURE 1 illustrates diagrammatically apparatus for controlling the amount of material transferred to a mould of a transfer moulding press, FIGURE 2 is a diagram illustrating the appropriate portion of the hydraulic circuit of a transfer moulding press, FIGURE 3 is an electrical circuit diagram and FIGURE 4 illustrates an alternative circuit arrangement.

The apparatus illustrated in the drawings and now to be described in more detail has been evolved for use on a down-stroking press with upstroking transfer plungers but it may be mentioned here that it could well be adapted for application to any other type of transfer moulding press.

Referring now to the drawings 10 denotes the hydraulic cylinder of an upstroking transfer plunger 11 which as is usual with transfer moulding presses is adapted on actuation initially to consolidate material present in a transfer pot 12 and ultimately inject such material into the mould indicated at 13. 14 denotes a line via which fluid under pressure is supplied to the cylinder 10 on appropriate actuation of a transfer cylinder control valve 15 (FIGURE 2). Connected to the line 14 so as to be influenced by the pressure in the hydraulic circuit is a pressure actuated electrical switch 16 which is adapted on actuation to cause energisation of a coil 17 (FIGURE 3) for effecting actuation of a collet or like gripper device 18 hereinafter more fully referred to. Actuation of the switch 16 is also adapted to energize a relay coil 19 having "hold-in" contacts 20 such that the coil 17 will remain energized when or if the pressure in the hydraulic circuit drops.

21 denotes an ejector table movable with the plunger 10 such table being equipped with the aforesaid collet or gripper device 18 which latter is adapted on operation to cooperate with a cam rod 22 carrying a cam 23 adapted on movement of the plunger 11 to cooperate with a normally closed micro switch 24. The rod 22 is provided with means such as indicated at 25 whereby the effective length of the stroke of the rod and hence the length of the stroke of the transfer plunger 11 may be adjusted as required. The arrangement is such that on completion of a pre-adjusted or pre-set stroke of the cam rod 22 the switch 24 will be opened either to neutralise the hydraulic control valve 15 or to actuate a pressure drop-off device.

In the portion of the hydraulic circuit shown in FIGURE 2, 26 denotes a low pressure selector valve which in one position allows full hydraulic pressure to be applied to the transfer cylinder and in the other position allows reduced hydraulic pressure pre-set on a pressure reducing valve 27, to the cylinder. The valve 27 predetermines the reduced hydraulic pressure which is required when the micro-switch 24 operates.

In the circuit layout illustrated in FIGURE 3 appropriate parts or components already referred to above are indicated but in addition 28 denotes a coil for neutralising the low pressure reducing valve 26 while 29 denotes a coil for neutralising the hydraulic control valve 15. 30 denotes a switch which enables the device either to reduce the pressure or to neutralise the injection control valve.

FIGURE 4 shows a possible circuit modification but it will be appreciated that both the circuits indicated in FIGURES 3 and 4 are in fact very similar the only difference being that in one the coils 17 and 19 are in parallel whereas in the other they are arranged in series.

The operation of the apparatus described above is as follows:

Upon loading of material into the transfer pot 12 the valve 15 will be actuated to cause fluid under pressure to be supplied to the hydraulic cylinder 10 thereby to cause the plunger 11 to rise. Initially, the movement of the plunger 11 will be effective to consolidate the material in the pot 12 without injecting such material into the mould and during this period the cam rod 22 will remain stationary.

Consolidation of the material is indicated by a rise in pressure in the hydraulic circuit which will cause the pressure operated switch 16 to be actuated. As indicated above the operation of the switch 16 will result in energisation of the coil 17 and of the coil 19 so that the contacts 20 will remain closed when or if the pressure drops. Energisation of the coil 17 will cause the collet or gripper device 18 on the table 21 to grip the rod 22 which will thereafter move with the transfer plunger 11 through a full pre-set stroke.

Upon completion of the pre-set stroke the cam 23 will operate the micro switch 24, which as indicated above will be effective to neutralise the control valve 15 or to initiate a pressure drop-off device so that the transfer plunger 11 will then be lowered. The opening of the switch 24 will simultaneously result in de-energisation of the relay coil 19 with consequent opening of the contacts 20 and in de-energisation of the coil 17 with resultant release of the collet or gripper device 18 which will allow the cam rod 22 to resume its initial position ready for the next cycle. It will be appreciated that on lowering of the cam 22 the switch 24 will be restored to its initial position.

As hereinbefore indicated, the apparatus described above is particularly adapted for use on down-stroking transfer moulding presses but it could well be applied to any other type of transfer moulding press.

I claim:
1. In a transfer moulding press including a transfer pot and an hydraulically operated transfer plunger the provision of control means adapted to be actuated automatically, subsequently to an initial movement of the plunger to consolidate material present in the pot, to control the length of the actual transfer stroke of the transfer plunger comprising an adjustable element capable of being pre-set to provide for a predetermined length of plunger stroke, means actuatable as a result of an increase in hydraulic pressure due to consolidation of material in the transfer pot, to cause said element to be effectively coupled to the transfer plunger to move therewith and a control switch actuatable by said element upon completion of the pre-set stroke to cause retraction of the plunger.

2. Control means as in claim 1 in which the element comprises a rod having means associated therewith whereby its effective length may be adjusted, there being a collet or like gripper device associated with the transfer plunger and operable to grip said rod as a result of the increase in hydraulic pressure.

3. Control means as in claim 2 in which the collet or like gripper device is controlled through the medium of a coil the energisation of which is controlled through the medium of a hydraulic pressure operated switch.

4. Control means as in claim 3, in which the pressure operated switch is adapted on operation also to energise a relay having "hold-in" contacts so that on actuation of said switch to energise the coil the relay contacts will remain in and will ensure continued energisation of the coil in the event of a drop in the hydraulic pressure.

5. Control means as in claim 1 in which the adjustable element carries a cam element adapted on completion of the preset stroke to cooperate with a switch controlling a valve supplying hydraulic fluid under pressure or a pressure drop-off device.

References Cited

UNITED STATES PATENTS

| | | | |
|---|---|---|---|
| 2,522,134 | 9/1950 | Sayre | 18—30 |
| 2,627,087 | 2/1953 | Hendry | 18—30 |
| 2,671,247 | 3/1954 | Lester | 18—30 |
| 2,786,234 | 3/1957 | Beyer. | |
| 2,983,956 | 5/1961 | Vogel et al. | 18—30 |
| 3,200,444 | 8/1965 | Davis | 18—30 |
| 3,278,992 | 10/1966 | Strauss | 18—30 |

J. HOWARD FLINT, JR., *Primary Examiner.*